(12) United States Patent
Cook

(10) Patent No.: US 8,248,693 B2
(45) Date of Patent: Aug. 21, 2012

(54) REFLECTIVE TRIPLET OPTICAL FORM WITH EXTERNAL REAR APERTURE STOP FOR COLD SHIELDING

(75) Inventor: Lacy Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 666 days.

(21) Appl. No.: 12/264,887

(22) Filed: Nov. 4, 2008

(65) Prior Publication Data

US 2010/0110539 A1    May 6, 2010

(51) Int. Cl.
G02B 23/00    (2006.01)
(52) U.S. Cl. ......... 359/399; 359/366; 359/859; 359/861
(58) Field of Classification Search .................. 359/366, 359/399, 850, 857–859, 861
See application file for complete search history.

(56) References Cited

U.S. PATENT DOCUMENTS

| | | | | |
|---|---|---|---|---|
| 4,240,707 A | * | 12/1980 | Wetherell et al. | 359/859 |
| 4,265,510 A | * | 5/1981 | Cook | 359/366 |
| 4,691,999 A | | 9/1987 | Wheeler | |
| 4,733,955 A | * | 3/1988 | Cook | 359/859 |
| 4,834,517 A | | 5/1989 | Cook | |
| 5,144,496 A | * | 9/1992 | Kashima | 359/859 |
| 5,170,284 A | * | 12/1992 | Cook | 359/365 |
| 5,173,801 A | * | 12/1992 | Cook | 359/365 |
| 5,414,555 A | | 5/1995 | Chan et al. | |
| 5,477,395 A | | 12/1995 | Cook | |
| 5,627,675 A | | 5/1997 | Davis et al. | |
| 5,802,335 A | * | 9/1998 | Sturlesi et al. | 359/364 |
| 7,545,446 B2 | * | 6/2009 | Lerner et al. | 348/770 |
| 7,719,759 B2 | * | 5/2010 | Nakano et al. | 359/366 |
| 7,952,799 B2 | * | 5/2011 | Bentley et al. | 359/432 |
| 8,004,755 B2 | * | 8/2011 | Mann et al. | 359/365 |
| 8,018,650 B2 | * | 9/2011 | Mann | 359/366 |
| 8,085,466 B2 | * | 12/2011 | Betchley | 359/366 |
| 2003/0179443 A1 | | 9/2003 | Cook | |
| 2007/0263304 A1 | * | 11/2007 | Sakagami et al. | 359/857 |
| 2008/0266687 A1 | * | 10/2008 | Cook | 359/859 |

OTHER PUBLICATIONS

Written Opinion of the International Searching Authority for International Application No. PCT/US2009/062263, filed Oct. 27, 2009, Written Opinion dated Dec. 7, 2009 and mailed Dec. 22, 2009 (4 pgs.).
International Search Report for International Application No. PCT/US2009/062263, filed Oct. 27, 2009, International Search Report dated Dec. 7, 2009 and mailed Dec. 22, 2009 (2 pgs.).

* cited by examiner

Primary Examiner — Frank Font
(74) Attorney, Agent, or Firm — Christie, Parker & Hale, LLP

(57) ABSTRACT

An all-reflecting, non-relayed optical system having an aperture stop and an optical axis and configured to provide images of objects. The system includes a positive power primary mirror configured to receive radiation from the objects, a negative power secondary mirror configured to receive the radiation reflected from the primary mirror and a positive power tertiary mirror configured to receive the radiation reflected from the secondary mirror. The system further includes a focal plane configured to receive the radiation reflected from the tertiary mirror and to form an image of the objects. The aperture stop of the optical system is located between the tertiary mirror and the image plane. Accordingly, the image plane may be cold shielded to prevent or reduce radiation reflected from the optical elements that interferes with the desired image.

14 Claims, 7 Drawing Sheets

REFLECTIVE TRIPLET OPTICAL FORM WITH EXTERNAL REAR APERTURE STOP FOR COLD SHIELDING

BACKGROUND

1. Field of the Invention

The present invention relates to a reflective triplet optical form with an external rear aperture stop for cold shielding.

2. Description of the Related Art

Electromagnetic radiation imaging systems have been widely used to image objects at long distances by telescope in the visual and infrared portions of the radiation spectrum.

Generally, optical elements of long distance telescopes may be refractive or reflective. Refractive optical elements are generally effective in controlling and/or preventing aberrations, and may be used in a variety of applications. However, refractive optical elements are not optimum for applications that require a large aperture. Such refractive optical elements (e.g., lenses) are difficult to manufacture and result in greater expense, because it is necessary to manufacture large lens elements for these systems. The large lens elements also tend to flex, resulting in a decrease of image quality. Moreover, refractive optical elements by their nature may also absorb radiation because they are not completely transparent at certain wavelengths.

Reflecting optical elements, on the other hand, have been used in place of refractive optical elements to provide large aperture optical systems. Such reflecting optical elements may be manufactured with greater thickness so as not to flex as easily. In addition, reflective optical elements do not allow light to pass through, but rather, reflect radiation at most wavelengths, resulting in less loss of radiation.

The minimum number of optical elements is generally recognized to be three, to provide the minimum number of parameters that are necessary to correct for and/or prevent spherical aberration, coma, astigmatism and field curvature. An optical imaging system composed of three optical elements is known as a triplet.

Reflective optical triplets are generally constructed such that radiation enters the system from a distant object, is received on a primary mirror, is reflected onto a secondary mirror, is received on a tertiary mirror, and finally, is focused on an image plane where an image of the distant object is formed. Historically, a positive/negative/positive reflective optical triplet can be traced back to the work of Maurice Paul, in 1935 and James G. Baker, in 1945.

Modernly, many prior art reflective optical triplets are composed such that all of the optical elements lie on the optical axis of the optical system. This arrangement results in the occlusion of a significant portion of the radiation entering the system from a distant object, a restriction of the field of view of the system and a constraint on the power distribution between optical elements.

Accordingly, other modern prior art reflective optical triplets are composed such that the field of view is not along the optical axis of the optical system but entirely to one side of it. In the prior art, U.S. Pat. No. 4,240,707 to W. Wetherell and D. Wemble (the "Wetherell '707 patent", which is incorporated herein by reference, is representative of such a reflective optical triplet. The reflective optical triplet described in the Wetherell '707 patent has an aperture stop on the optical axis and is physically located on the secondary mirror. The entrance pupil to the optical system described in the Wetherell '707 patent is located a large distance behind the optical system, and as such, is virtual.

In addition, yet other modern prior art reflective optical triplets are composed of off-axis portions of the optical elements, such as in the Wetherell patent, but also incorporates a real entrance pupil, such as in U.S. Pat. No. 4,733,955 to L. Cook (the "Cook '955 patent"), which is incorporated herein by reference. The reflective optical triplet in the Cook '955 patent, as a natural result of the real entrance pupil, has a defining front aperture stop coincident with the real entrance pupil.

SUMMARY OF THE INVENTION

Exemplary embodiments according to the present invention provide a reflective triplet optical form with a rear aperture stop for cold shielding. The system may be utilized for providing images of distant objects. Using all-reflecting optical elements, the system is configured such that the aperture stop of the optical system is between the last optical element and the image plane. With the aperture stop in this position, the image plane may be cold shielded more effectively than prior art systems. Therefore, it is possible to generate higher quality infrared images due to a decrease in radiation reflected and/or scattered from the optical elements and the structure within the optical system (i.e., decreased noise).

According to an exemplary embodiment of the present invention, there is disclosed an all-reflecting, non-relayed optical system having an aperture stop and an optical axis and configured to provide images of objects, wherein the system includes a primary mirror configured to receive radiation from the objects, a secondary mirror configured to receive the radiation reflected from the primary mirror, a tertiary mirror configured to receive the radiation reflected from the secondary mirror, and an image plane configured to receive the radiation reflected from the tertiary mirror and to form an image of the objects, wherein the aperture stop of the optical system is located between the third mirror and the image plane.

The aperture stop may be further located above and slightly to the left or to the right of the secondary mirror, in reference to the tangential plane of the optical system. The aperture stop may also be located approximately halfway between the tertiary mirror and the image plane.

According to another exemplary embodiment of the present invention, there is disclosed an all-reflecting, non-relayed optical system having an optical axis, wherein the system includes an off-axis concave primary mirror configured to receive radiation from objects, an off-axis convex secondary mirror configured to receive the radiation reflected from the primary mirror, an off-axis concave tertiary mirror configured to receive the radiation reflected from the secondary mirror, a focal plane configured to receive the radiation reflected from the tertiary mirror and for forming an image of the objects, wherein an aperture stop of the optical system is located between the third mirror and the image plane, and a cold cavity having a window coincident with the aperture stop and having boundaries up to and between the aperture stop and the focal plane.

According to another exemplary embodiment of the present invention, there is disclosed a method of imaging objects in an all-reflecting, non-relayed optical system having an optical axis, the method reflects radiation received from objects in a first direction relative to the optical axis utilizing a primary mirror, reflects the radiation received from the first mirror in a second direction relative to the optical axis utilizing a secondary mirror, reflects the radiation received from the secondary mirror in a third direction relative to the optical axis utilizing a tertiary mirror, forms an image of the distant objects utilizing an image plane, wherein an aperture stop of the optical system is located between the tertiary mirror and the focal plane, and provides cold shielding up to and between the aperture stop and the focal plane.

BRIEF DESCRIPTION OF THE DRAWINGS

A more complete appreciation of the present invention, and many of the attendant features and advantages thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Accordingly, there is presented a reflective triplet optical form with a rear aperture stop for cold shielding in accordance with embodiments of the present invention. The system may be utilized for providing images of distant objects. Using all-reflecting optical elements, the system is configured such that the aperture stop of the optical system is between the last optical element and the image plane. With the aperture stop in this position, the image plane may be cold shielded more effectively than prior art systems. Therefore, it is possible to generate higher quality infrared images due to a decrease in radiation reflected and/or scattered from the optical elements and the structure within the optical system (i.e., decreased noise).

Figure 1:
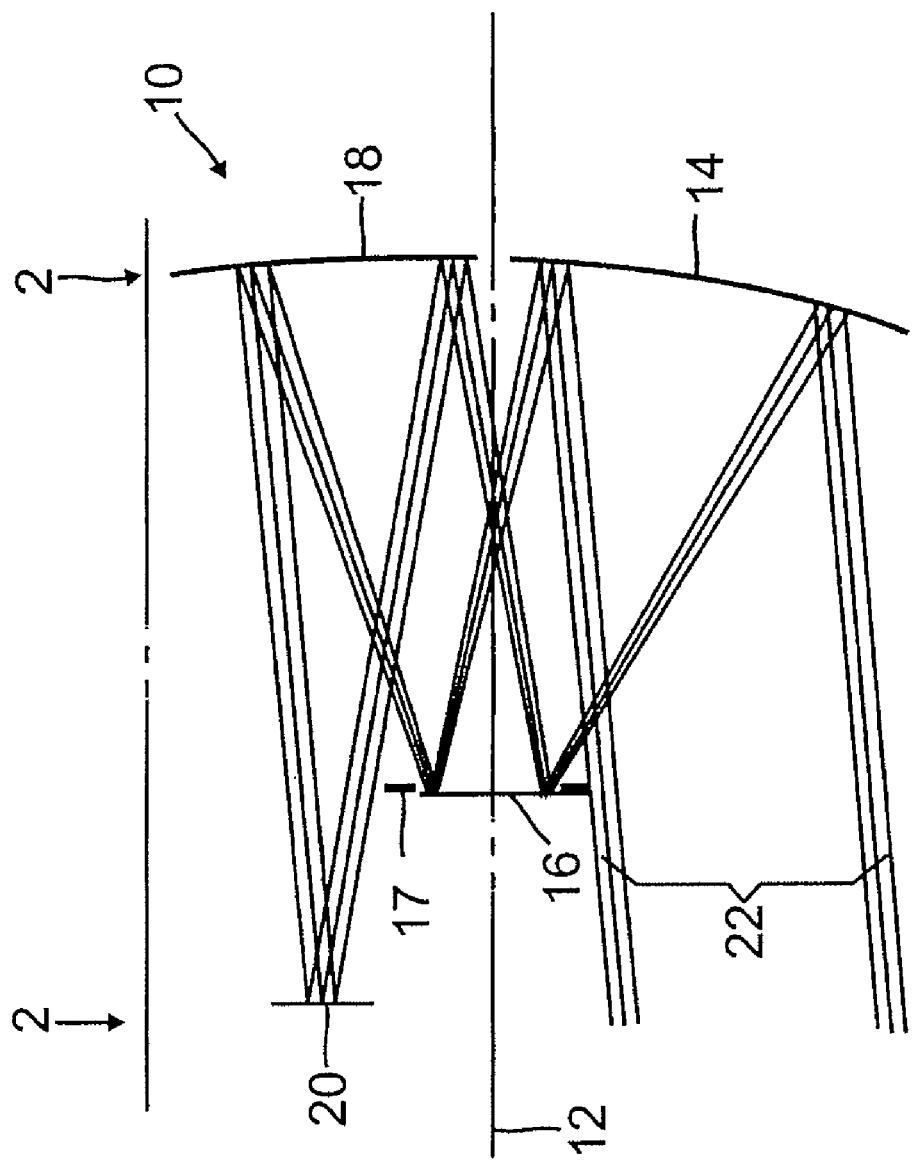
FIG. 1 is a side elevational schematic view illustrating a typical prior art three mirror, eccentric, nonrelayed optical system.
Figure 2:
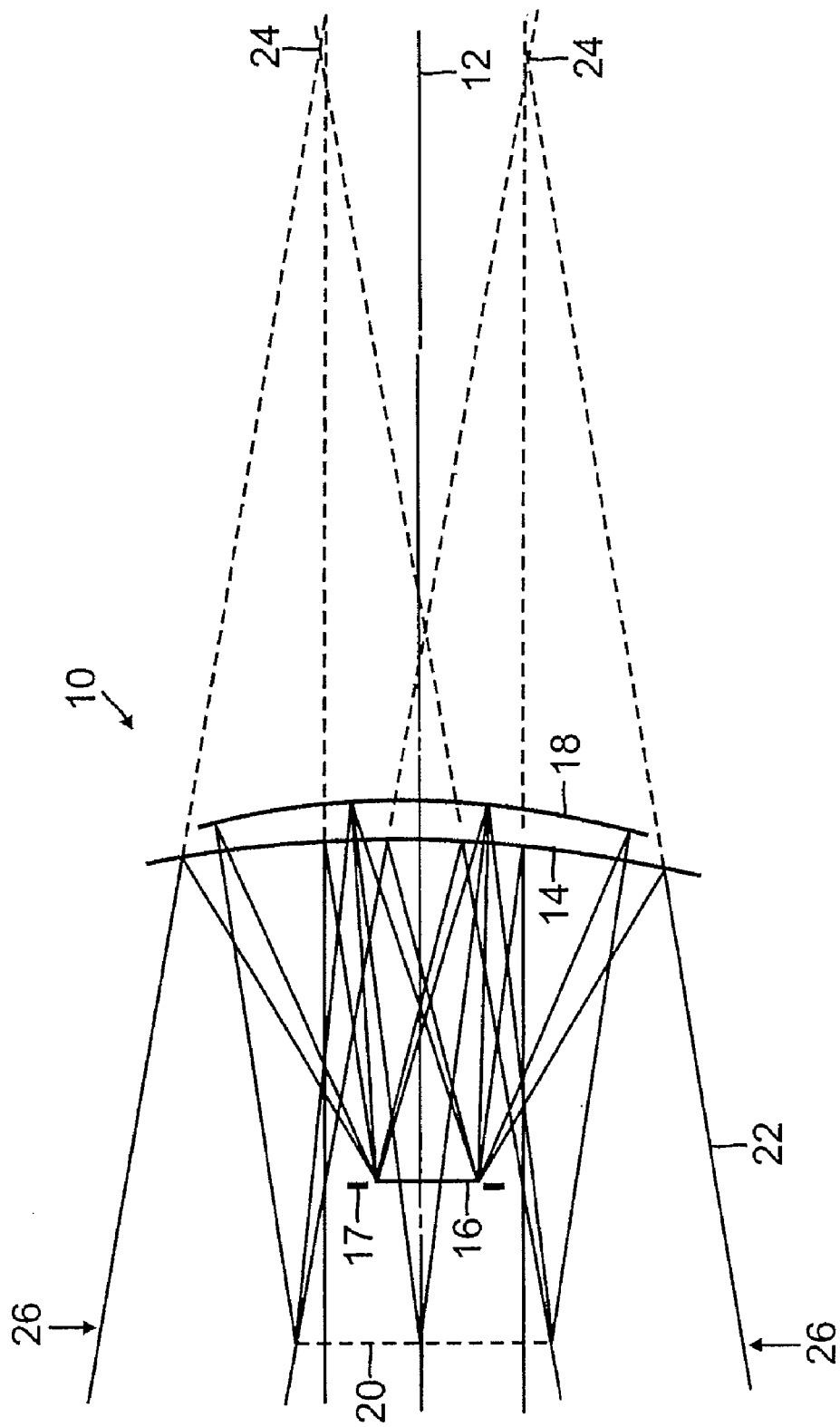
FIG. 2 is a plan view thereof taken along the line 2-2 of FIG. 1.

FIG. 1 is a side elevational schematic view illustrating a typical prior art three mirror, eccentric, nonrelayed optical system. FIG. 2 is a plan view illustrating the typical prior art three mirror, eccentric nonrelayed optical system taken along the line 2-2 of FIG. 1.

Referring to FIGS. 1 and 2, a prior art reflective triplet 10 includes an optical axis 12 and comprises a positive primary mirror 14, a negative secondary mirror 16, a positive tertiary mirror 18 and an image sensor 20. An aperture stop 17 of the reflective triplet 10 is symmetrically disposed about the optical axis 12 and is physically located at approximately the periphery of the secondary mirror 16. The optical elements of the reflective triplet 10 are fixed in place by conventional structure (not shown). Referring to FIG. 2, the dotted extensions of beam 22 that converge at points 24 define a virtual entrance pupil between the points 24. Since the entrance pupil of the reflective triplet 10 is virtual, there may be beam wander illustrated by the points 26.

Figure 3:
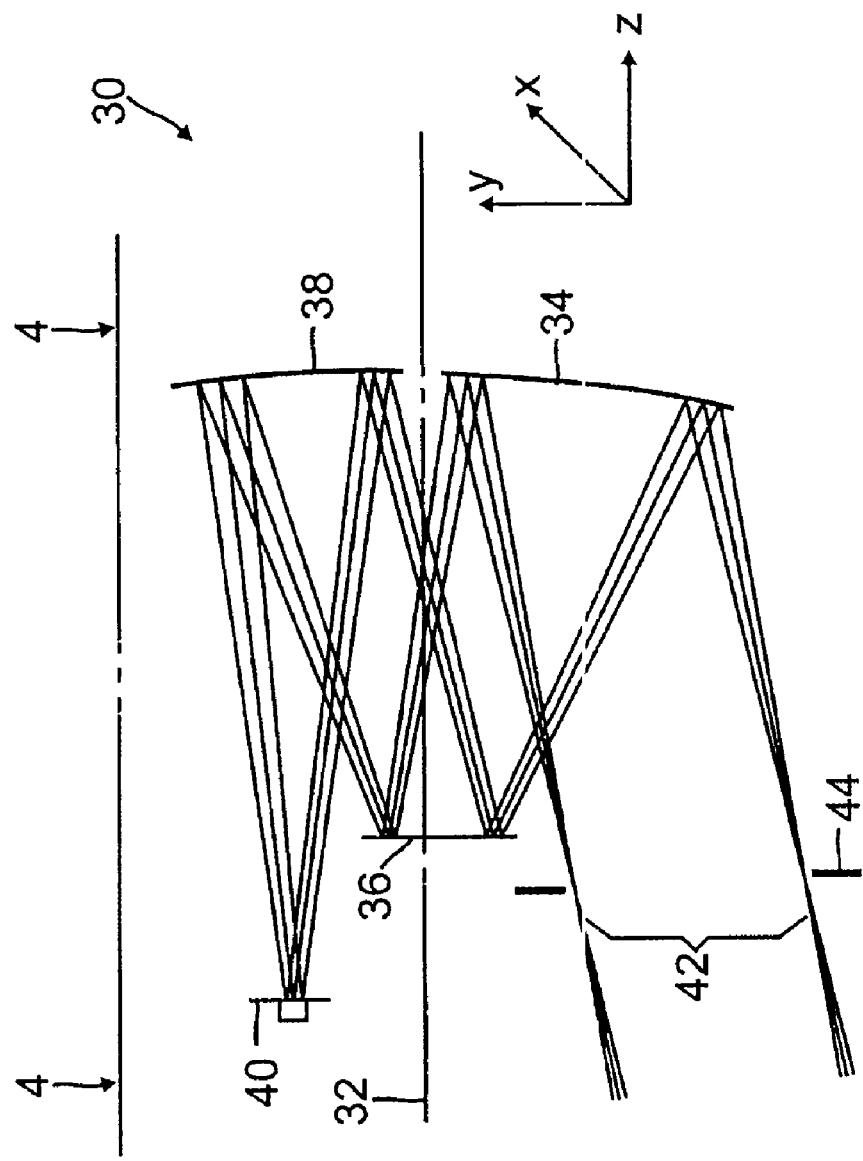
FIG. 3 is a side elevational schematic view illustrating another typical prior art three mirror, eccentric, nonrelayed optical system.
Figure 4:
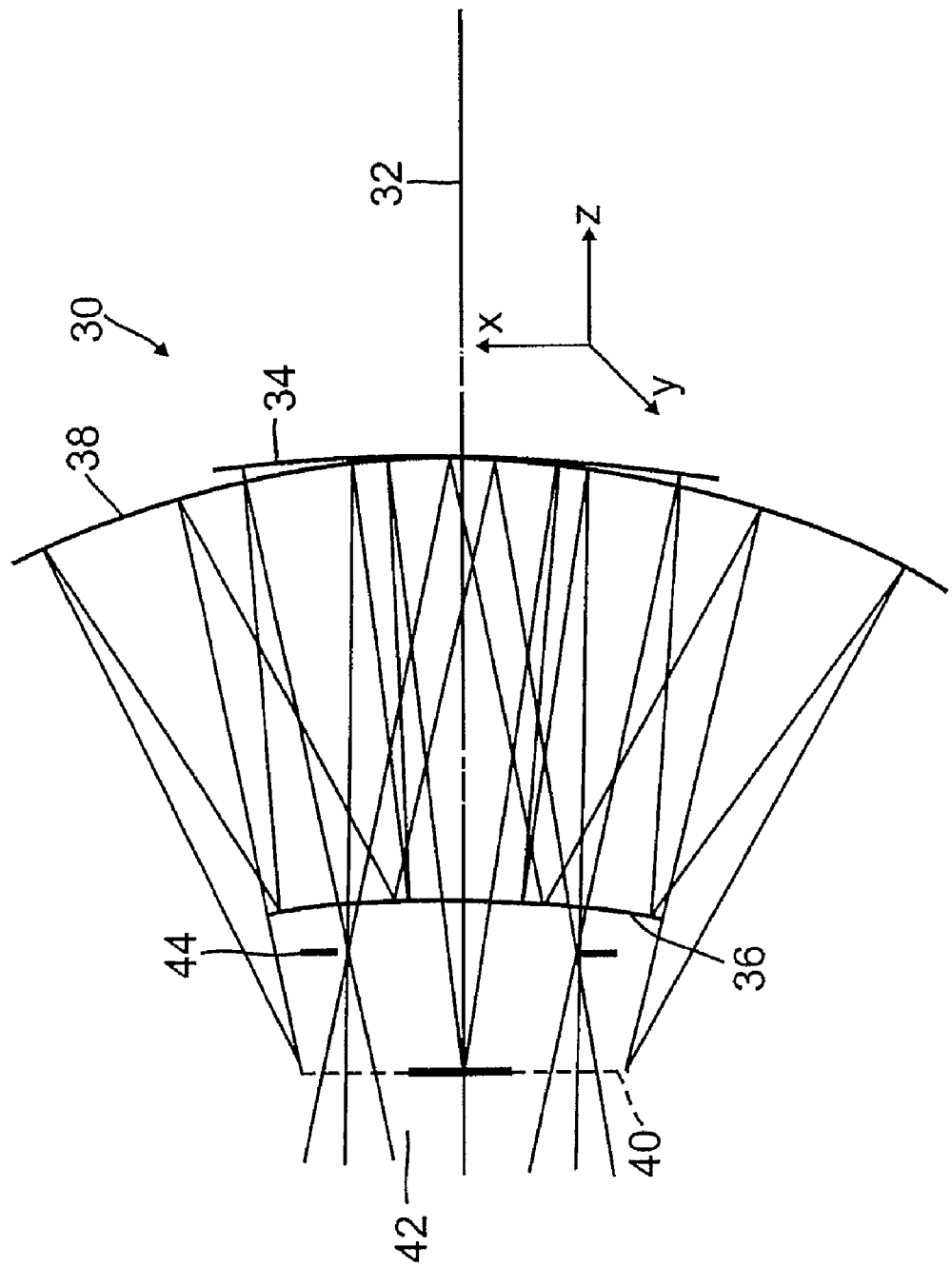
FIG. 4 is a plan view thereof taken along the line 4-4 of FIG. 3.

FIG. 3 is a side elevational schematic view illustrating another typical prior art three mirror, eccentric, nonrelayed optical system. FIG. 4 is a plan view thereof taken along the line 4-4 of FIG. 3.

Referring to FIGS. 3 and 4, a prior art reflective triplet 30 includes an optical axis 32 and comprises a positive primary mirror 34, a negative secondary mirror 36, a positive tertiary mirror 38 and an image sensor 40. The optical elements of the reflective triplet 30 are fixed in place by conventional structure (not shown). The primary mirror 34, the secondary mirror 36 and the tertiary mirror 38 are all off-axis in relation to the optical axis 32. Referring to FIG. 4, a beam 42 is admitted via a real entrance pupil 44 located off-axis from the optical axis 32. An aperture of the reflective triplet 30 is physically located at approximately the periphery of the off-axis real entrance pupil 44.

Figure 5:
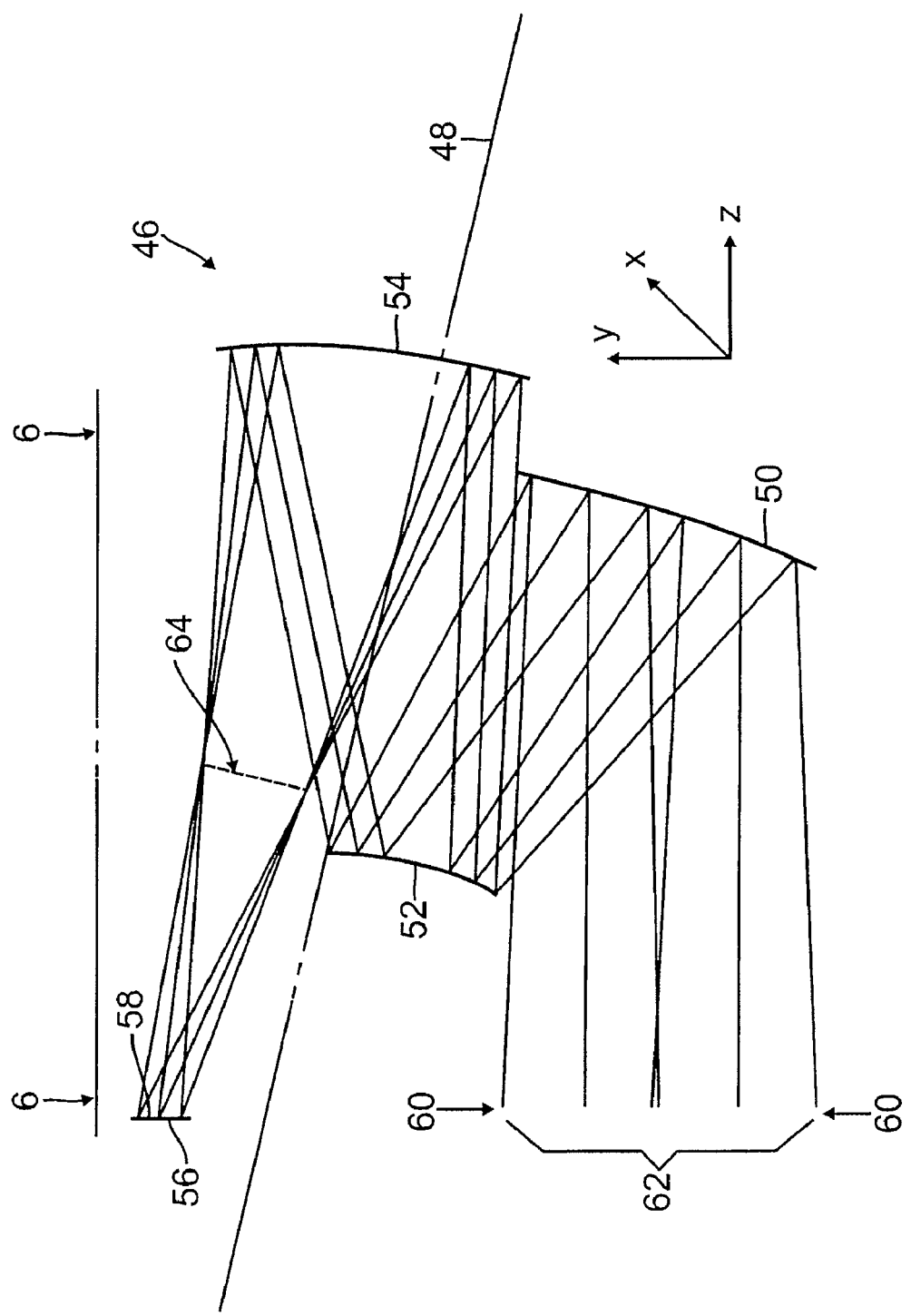
FIG. 5 is a side elevational schematic view, taken in a tangential plane, of an exemplary embodiment in accordance with the present invention.
Figure 6:
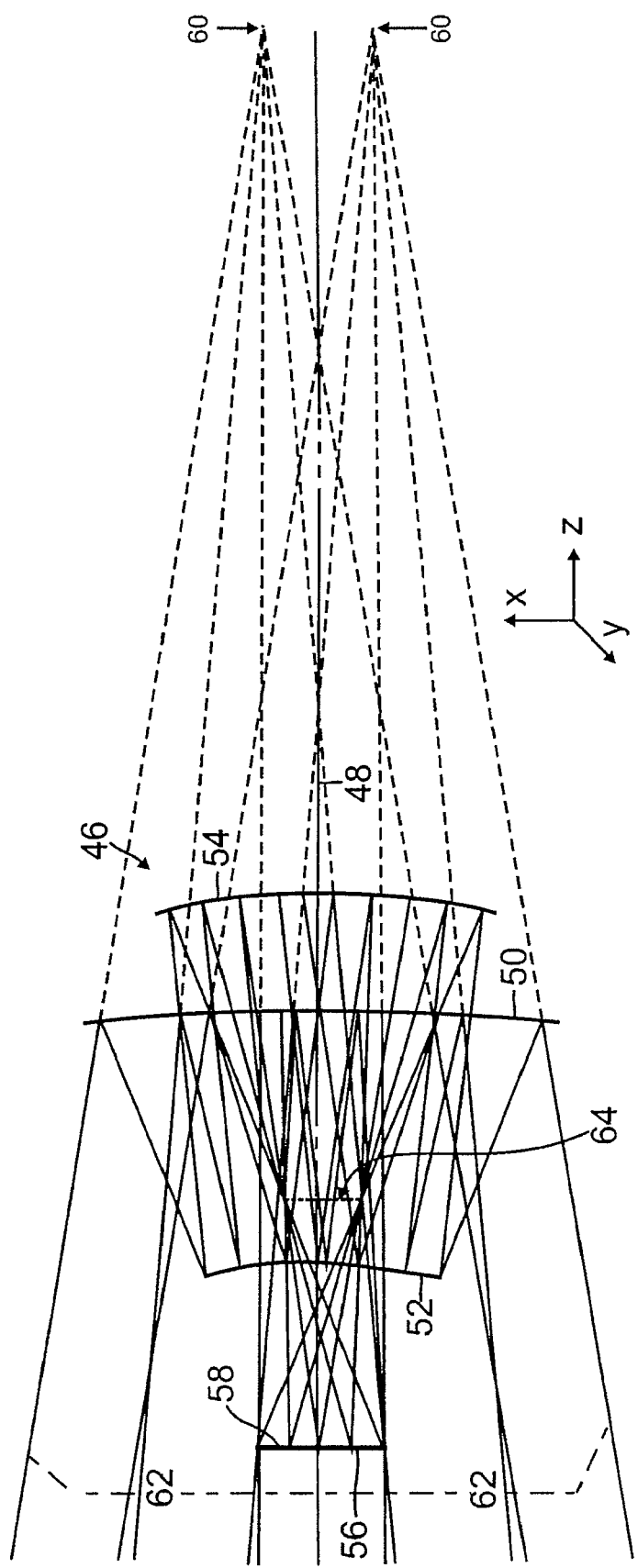
FIG. 6 is a plan view thereof, taken in a sagittal plane along the line 6-6 of FIG. 5.

FIG. 5 is a side elevational schematic view, taken in a tangential plane, of an exemplary optical system including a reflective triplet optical form with a rear aperture stop for cold shielding in accordance with the present invention. FIG. 6 is a plan view thereof, taken in a sagittal plane along the line 6-6 of FIG. 5.

Referring to FIGS. 5 and 6, the optical system 46 includes an optical axis 48, and comprises a positive power primary mirror 50, a negative power secondary mirror 52, a positive power tertiary mirror 54 and an image plane 56. The primary mirror 50, the secondary mirror 52 and the tertiary mirror 54 are all off-axis from the optical axis 48. Disposed on the image plane 56 is an image sensor 58. The image sensor 58 may be any suitable image sensor, and is not necessarily limited to use with certain wavelengths of radiation.

The optical system as depicted in FIGS. 5 and 6 includes a virtual entrance pupil 60, wherein a radiation beam 62 first impinges on the primary mirror 50, reflects off of the primary mirror 50, impinges on the secondary mirror 52, reflects off of the secondary mirror 52, impinges on the tertiary mirror 54, reflects off of the tertiary mirror 54, and impinges on the image sensor 58.

A defining aperture stop 64 of the optical system 46 is located between the tertiary mirror 54 and the image plane 56. In this position, the image plane 56 and the image sensor 58 may be placed inside a cryo-vac cold cavity 66 (e.g., see FIG. 7) to substantially completely cold shield the image plane 56 and the image sensor 58. Significantly, the optical elements in the reflective optical triplet (e.g., the primary mirror 50, the secondary mirror 52, and the tertiary mirror 54) are shielded from the image sensor 58 by the cryo-vac cold cavity 66 such that the image sensor 58 sees only cold black Dewar walls (e.g., the cold walls of the cryo-vac cold cavity 66) and warm low-emissivity mirror surfaces, since the optical elements are all outside of the cryo-vac cold cavity 66. In this position, the aperture stop 64 defines the Dewar boundary of the cryo-vac cold cavity 66, external to the optical elements. The external rear aperture stop location naturally results in the virtual entrance pupil 60 shown in FIGS. 5 and 6. The aperture stop 64 as shown in FIGS. 5 and 6 may be located slightly above and to the right of the secondary mirror 52, in reference to the tangential plane of the optical system. More specifically, the aperture stop 64 may be located approximately halfway between the third mirror and the image plane.

Figure 7:
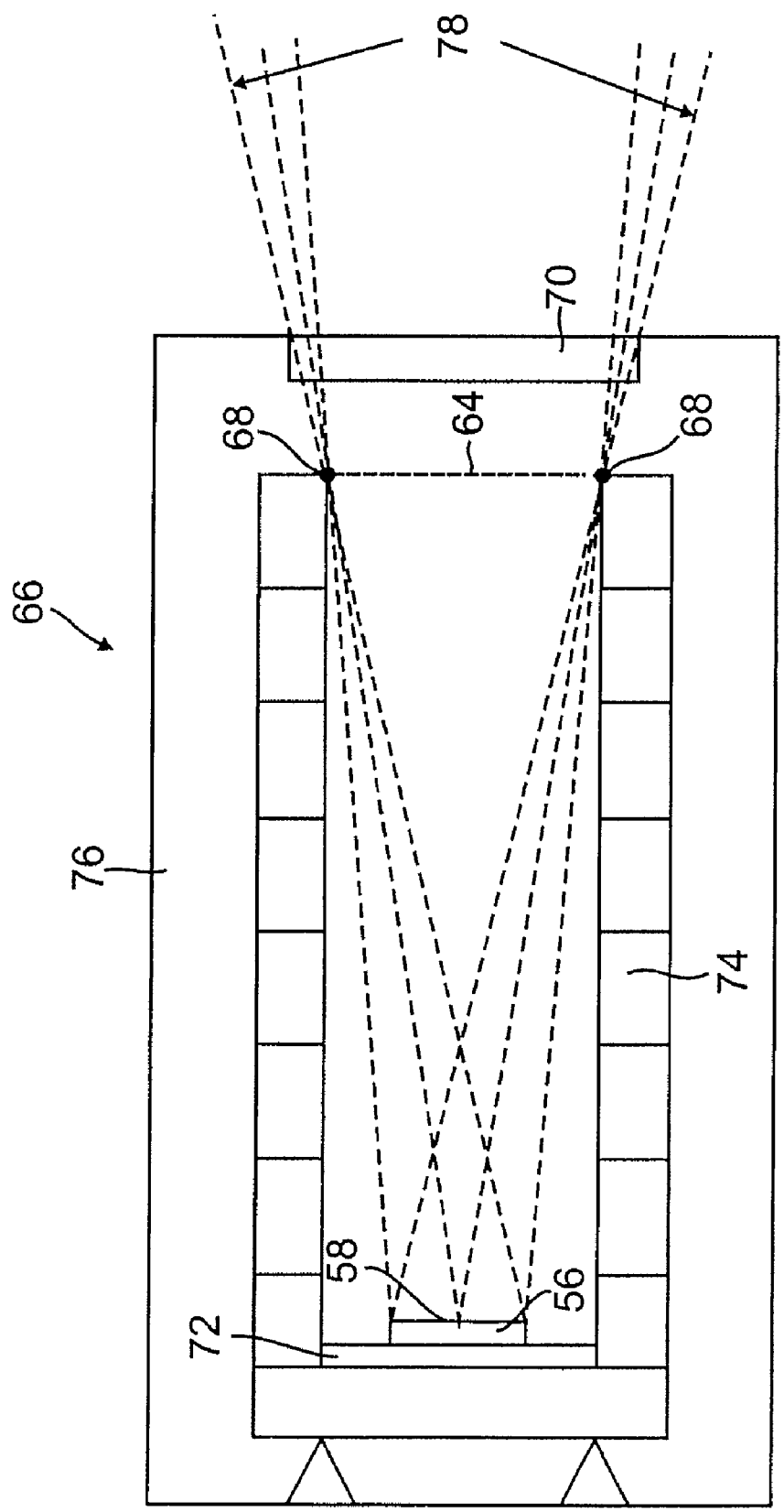
FIG. 7 is an illustration of an exemplary cryo-vac cold cavity in accordance with an embodiment of the present invention.

FIG. 7 is an illustration of an exemplary cryo-vac cold cavity in accordance with an embodiment of the present invention.

Referring to FIG. 7, the cryo-vac cold cavity 66 is situated such that the aperture stop 64 of the optical system 46 of FIGS. 5 and 6 is located at the Dewar boundary of the cryo-vac cold cavity 66 (e.g., between points 68). The cryo-vac cold cavity 66 comprises a transmitting window 70, a focal plane array 72, a cold shield 74 and a cryo-vac housing 76. The interior of the cryo-vac cold cavity 66, bounded by the aperture stop 64, the interior walls of the cold shield 74 and the image sensor 56. Also shown in FIG. 7 is the image plane 56 and the image sensor 58 thereon, mounted on the focal plane array 72. In operation, a beam 78 enters the cryo-vac cold cavity 66 via the transmitting window 70 and impinges upon the image plane 56, where the beam 78 is converted to a signal in accordance with the focal plane array 72 and receiver circuitry (not shown). As a cryogenically cooled Dewar-like optical system, the image sensor 56 may be particularly useful to image radiation from distant objects in the infrared portion of the spectrum.

The optical system 46, for example, is well suited for relatively fast system speeds in the range of, for example, F/2.0 to F/6.0. The optical system 46 is also well suited for both two-dimensional and high aspect ratio fields of view, a typical high aspect ratio field of view being 4.5°×18.0° (e.g., 81 degrees$^2$). Both conic and general aspheric mirror geometries may be utilized in the various embodiments. The optical system 46 may attain various levels of image quality, such as within the range of 10 to 100 microrads. In addition, the all-reflecting triplet is compact and images distant objects having fields of view comparable to a refracting triplet at larger aperture diameters. Moreover, as with all-reflecting systems, it is lightweight and accurate within a wide range of wavelengths.

The following TABLE provides a specific prescription for the optical system 46. The optical characteristics of an embodiment of the present invention constructed in accordance with such a specific prescription are a field of view of 4.5° in a tangential plane and 18.0° in the saggital plane (e.g., 81 degrees$^2$). The field of view offset is 12.204°. The virtual entrance pupil 60 has a diameter of 12 units of linear measurement (e.g., inches or centimeters). The effective focal length is 40 units, resulting in an F-number of F/3.33. The aperture stop is 7.794 units in diameter. In other embodiments, the field of view, the field of view offset, the effective focal length, the F-number and the aperture stop diameter may vary depending on the system requirements and design limitations. Accordingly, the specific prescription provided by the TABLE is not intended to limit the invention to this embodiment, but rather, to provide an exemplary embodiment thereof.

The TABLE identifies various surfaces under the heading Surf. No. (i.e., Surface Number), in which there is described various parameters and characteristics of the primary mirror 50, the secondary mirror 52, the tertiary mirror 54, the aperture stop 64 and the image plane 56. The primary mirror 50, the secondary mirror 52 and the tertiary mirror 54 are all reflective surfaces. The primary mirror 50 is positive, the secondary mirror 52 is negative and the tertiary mirror 54 is positive.

With respect to a coordinate system, the optical axis 48 is taken as the z axis passing through the center of the primary mirror 50. The y axis is taken in the tangential plane, and the x axis is taken in the sagittal plane. With reference to the view of the optical system 46 taken in the tangential plane, FIG. 5, the z axis points to the right, the y axis points upward and the x axis points into the page. With respect to the view of the optical system 46 taken in the sagittal plane, FIG. 6, the z axis points to the right, the x axis points up and the y axis points out of the page.

The equation:

$$z = \frac{c\rho^2}{1 + \sqrt{1 - (k+1)c^2\rho^2}} + d\rho^4 + e\rho^6 + f\rho^8 + g\rho^{10}$$

identifies various parameters in the specified prescription, where c is the surface curvature, k is the conic constant and $\rho$ is the distance from the optical axis.

The column designated Rd is the radius in units of linear dimension (e.g., inches or centimeters) of the specified surfaces. The minus sign indicates that the center of curvature is to the left of the mirror surface. The next column, designated CC, is the conic constant, equal to the negative squared value of the eccentricity of a conic section (e.g., a planar cut through a double sheeted conic surface). The surface of the primary mirror 50 has the shape of a hyperboloid. The secondary mirror 52 has the shape of an oblate spheroid. The tertiary mirror 54 has the shape of an oblate spheroid. All three of the mirrors have some aspheric correction measured in terms of the even powers of a radius measured in an x-y plane normal to the optical axis of the optical system.

The columns designated Ad, Ae, Af and Ag identify the high order aspheric coefficients for the $\rho^4$, $\rho^6$, $\rho^8$ and $\rho^{10}$ aspheric terms in the above equation. The next column, Yd, identifies the decentering distance. The decentering is measured in units of linear measurement (e.g., inches or centimeters) along the y axis, and represents a displacement of the vertex of a surface from the origin of the coordinate system. The decentering, or positioning of the vertex of each mirror or other optical element is accomplished prior to the implementation of the angle of tilt (i.e., Alpha in TABLE).

The column designated Alpha describes the tilt for each of the surfaces. Each of these mirror surfaces is formed as a surface of revolution, this being done by revolving a conic section about an axis. This axis may be parallel to the z axis, or may be tilted in the y-z plane (but not the x-z plane). The positive number of degrees of tilt represents a tilting in the counterclockwise direction with reference to the xyz coordinate system.

With respect to the revolving of the conic section about an axis, in the case of revolution of an ellipse, such revolution may take place about a major axis or a minor axis of the ellipse. In the case of the primary mirror 50, such revolution is about a major axis, this being indicated by the minus sign preceding the conic constant. In the case of the secondary mirror 52 and the tertiary mirror 54, the surfaces are produced by revolving an ellipse about its minor axis. This may be described mathematically by representing the eccentricity by a complex number wherein the eccentricity is pure imaginary. Therefore, squaring the eccentricity gives an additional minus sign making the conic constant positive as is indicated in the table for the secondary mirror 52 and the tertiary mirror 54.

Finally, the column designated Thk is the thickness of each of the surfaces. The image plane 64, however, is a plane and does not have a thickness. The thickness is measured in terms of linear measurement (e.g., inches or centimeters). The minus sign preceding the thickness values signifies that the next surface (e.g., from top to bottom in the column labeled Thk) is located along the negative z-axis relative to the previous surface.

TABLE

Prescription of a specific embodiment of the optical system illustrated in FIGS. 5 & 6

| Surf No. | Description | Rd | CC | Ad | Ae | Af | Ag | Yd | Alpha | Thk |
|---|---|---|---|---|---|---|---|---|---|---|
| 50 | Primary Mirror | −237.427 | −18.1906 | −3.675E−08 | 1.692E−11 | −3.767E−15 | 1.567E−18 | −5.865 | −1.829 | −30.0477 |
| 52 | Secondary Mirror | −53.974 | 0.23317 | −5.879E−07 | −8.636E−10 | −2.854E−13 | 7.507E−16 | −3.238 | 1.698 | 37.2439 |
| 54 | Tertiary Mirror | −67.072 | 0.22419 | 9.564E−09 | 1.128E−11 | −2.034E−14 | 1.479E−17 | −3.542 | 0.609 | −33.3759 |
| 64 | Aperture Stop | inf | n/a | n/a | n/a | n/a | n/a | 5.634 | −2.870 | −26.6327 |
| 56 | Image Plane | inf | n/a | n/a | n/a | n/a | n/a | 6.887 | 0.038 | n/a |

FOV is 4.5 × 18.0 degrees
FOV offset is 12.204 degrees
Entrance pupil is 12 diameter
Aperture Stop is 7.794 diameter
Focal Length is 40
Speed is F/3.33

It should be understood that the above described embodiments of the present invention are illustrative only and that modifications thereof may occur to those skilled in the art. Accordingly, the present invention is not to be regarded as limited to the embodiments disclosed herein, but is to be limited only as defined by the appended claims.

What is claimed is:

1. An all-reflecting, non-relayed optical system having an aperture stop and an optical axis and configured to provide images of objects, the system comprising:
    a primary mirror configured to receive radiation from the objects;
    a secondary mirror configured to receive the radiation reflected from the primary mirror;
    a tertiary mirror configured to receive the radiation reflected from the secondary mirror; and
    an image plane configured to receive the radiation reflected from the tertiary mirror and to form an image of the objects, wherein the aperture stop of the optical system is located between the tertiary mirror and the image plane,
    wherein the optical system is non-relayed.

2. The all-reflecting, non-relayed optical system of claim 1, further comprising
    a cold cavity having a window coincident with the aperture stop, the cold cavity enclosing space up to and between the aperture stop and the image plane.

3. The all-reflecting, non-relayed optical system of claim 1, wherein the aperture stop is further located slightly above and to the right of the secondary mirror, in reference to the tangential plane of the optical system.

4. The all-reflecting, non-relayed optical system of claim 1, wherein the aperture stop is further located approximately halfway between the tertiary mirror and the image plane.

5. The all-reflecting, non-relayed optical system of claim 1, wherein the primary, secondary and tertiary mirrors are off-axis from the optical axis of the optical system.

6. The all-reflecting, non-relayed optical system of claim 1, wherein the primary mirror is a positive power mirror, the secondary mirror is a negative power mirror, and the tertiary mirror is a positive power mirror.

7. An all-reflecting, non-relayed optical system having an optical axis comprising:
    an off-axis concave primary mirror configured to receive radiation from objects;
    an off-axis convex secondary mirror configured to receive the radiation reflected from the primary mirror;
    an off-axis concave tertiary mirror configured to receive the radiation reflected from the secondary mirror;
    a focal plane configured to receive the radiation reflected from the tertiary mirror and for forming an image of the objects, wherein an aperture stop of the optical system is located between the tertiary mirror and the focal plane; and
    a cold cavity having a window coincident with the aperture stop, the cold cavity enclosing space up to and between the aperture stop and the focal plane,
    wherein the optical system is non-relayed.

8. The all-reflecting, non-relayed optical system of claim 7, wherein the aperture stop is further located slightly above and to the right of the secondary mirror, in reference to the tangential plane of the optical system.

9. The all-reflecting, non-relayed optical system of claim 7, wherein the aperture stop is further located approximately halfway between the tertiary mirror and the focal plane.

10. A method of imaging objects in an all-reflecting, non-relayed optical system having an optical axis, the method comprising:
    reflecting radiation received from objects in a first direction relative to the optical axis utilizing a primary mirror;
    reflecting the radiation received from the first mirror in a second direction relative to the optical axis utilizing a secondary mirror;
    reflecting the radiation received from the secondary mirror in a third direction relative to the optical axis utilizing a tertiary mirror;
    forming an image of the distant objects utilizing an image plane, wherein an aperture stop of the optical system is located between the tertiary mirror and the focal plane; and
    providing cold shielding up to and between the aperture stop and the focal plan,
    wherein the optical system is non-relayed.

11. The method of claim 10, wherein the aperture stop is further located slightly above and to the right of the secondary mirror, in reference to the tangential plane of the optical system.

12. The method of claim 10, wherein the aperture stop is further located approximately halfway between the tertiary mirror and the focal plane.

13. The method of claim 10, wherein the primary, secondary and tertiary mirrors are configured such that each of the mirrors are off-axis from the optical axis of the optical system.

14. The method of claim 10, wherein the primary mirror is a positive power mirror, the secondary mirror is a negative power mirror, and the tertiary mirror is a positive power mirror.

* * * * *